Dec. 4, 1962  F. D. LAKINS ETAL  3,066,806
STOCK BAR FEED APPARATUS
Filed July 17, 1959  6 Sheets-Sheet 1
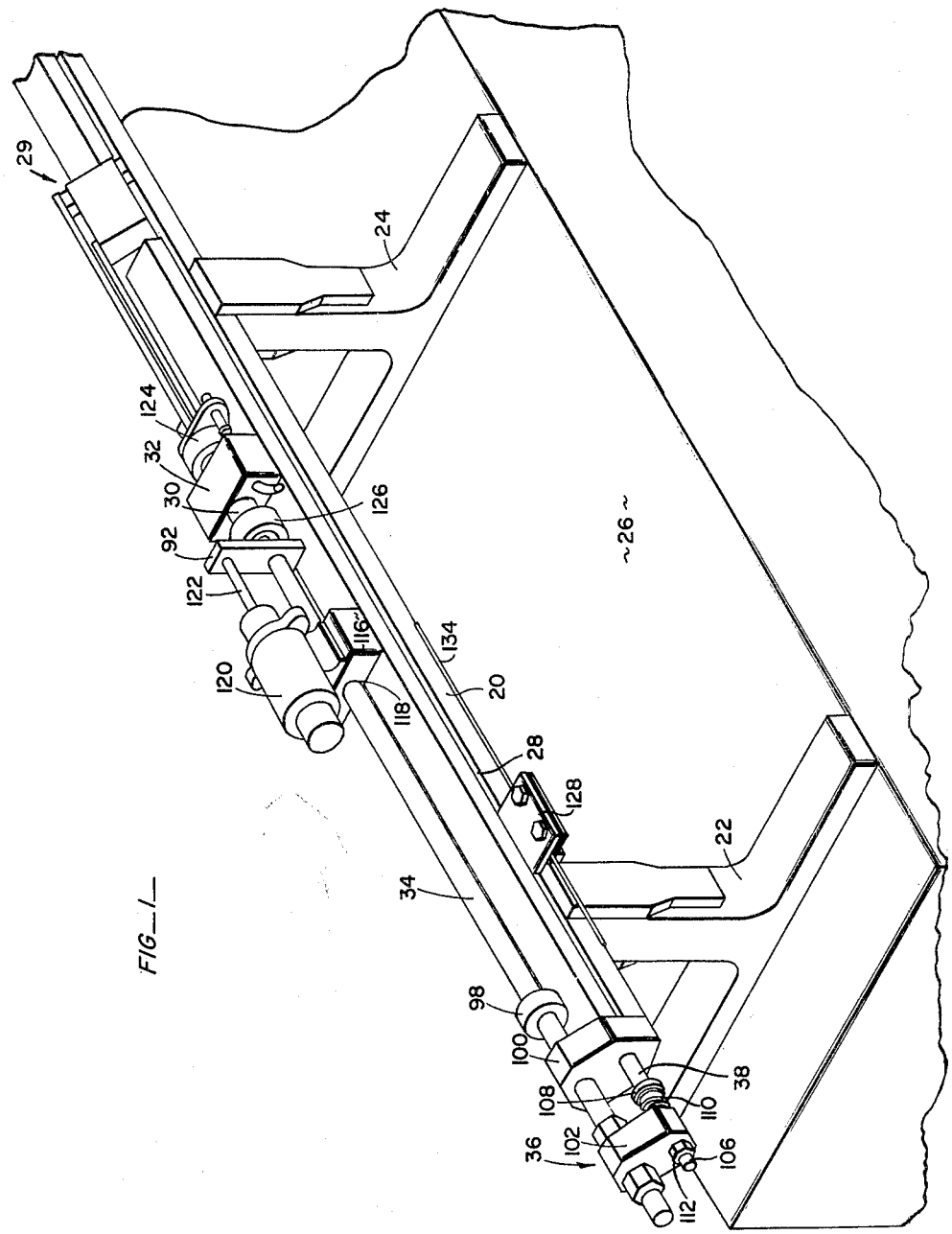
INVENTOR.
Franklin D. Lakins
Gerald B. Lanphere
BY
D. Emmett Thompson
ATTORNEY Dec. 4, 1962
F. D. LAKINS ETAL
3,066,806
STOCK BAR FEED APPARATUS
Filed July 17, 1959
6 Sheets-Sheet 2
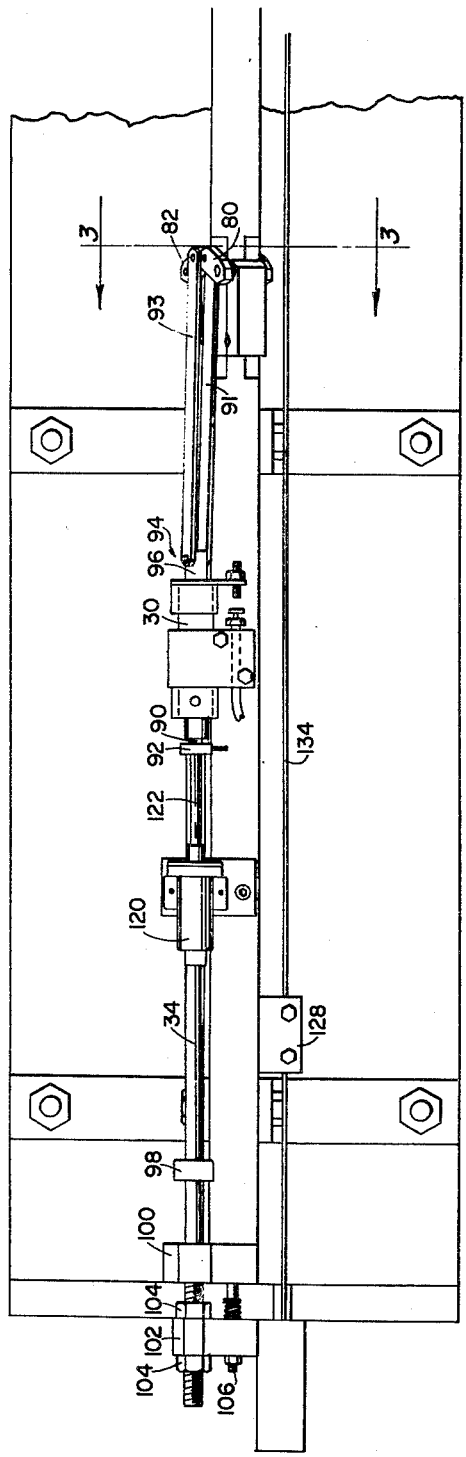
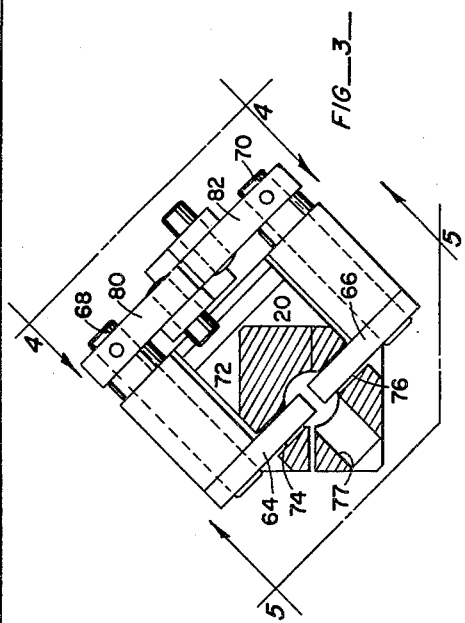
INVENTOR.
Franklin D. Lakins
Gerald B. Lanphere
BY
D. Emmett Thompson
ATTORNEY Dec. 4, 1962  F. D. LAKINS ETAL  3,066,806
STOCK BAR FEED APPARATUS
Filed July 17, 1959  6 Sheets-Sheet 3
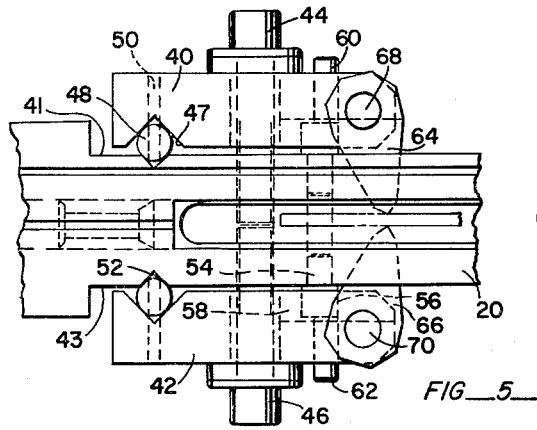
FIG_5_
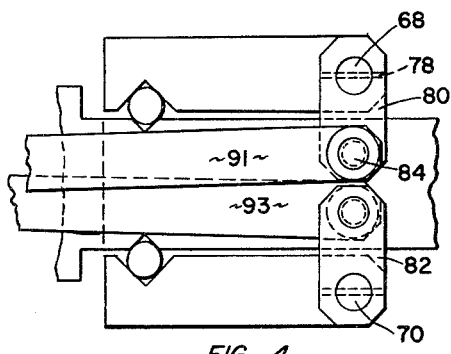
FIG_4_
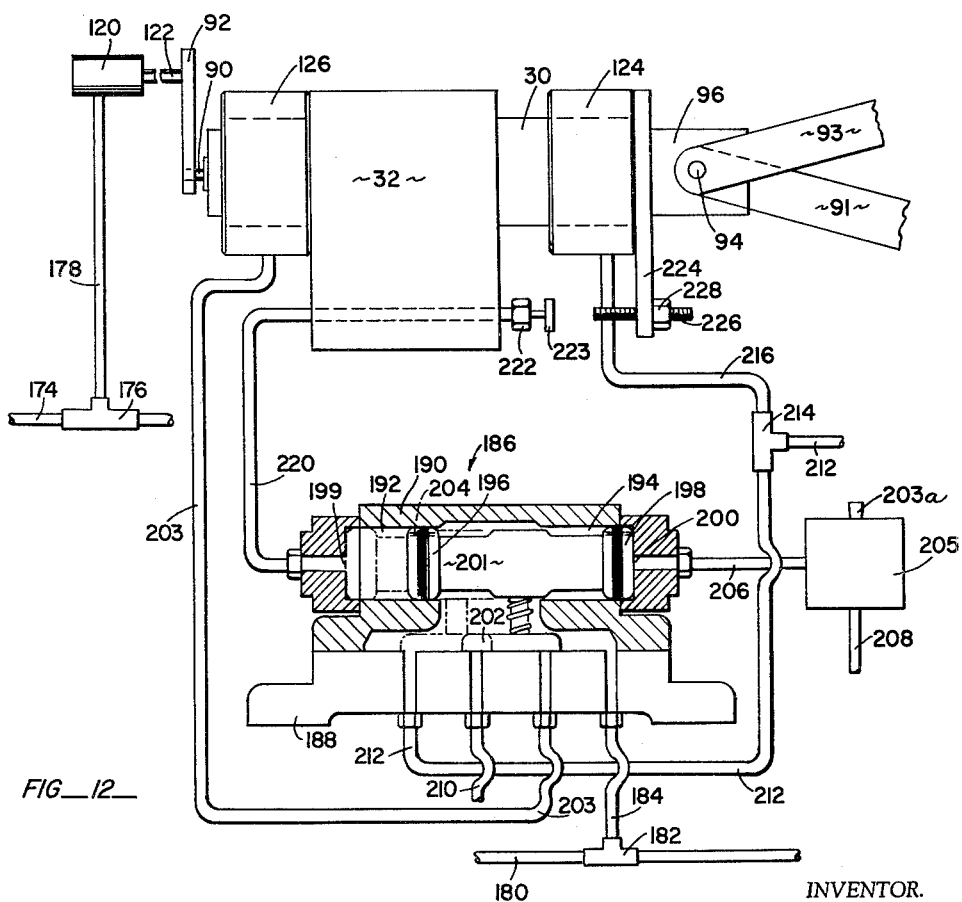
FIG_12_
INVENTOR.
Franklin D. Lakins
Gerald B. Lanphere
BY
D. Emmett Thompson
ATTORNEY Dec. 4, 1962  F. D. LAKINS ETAL  3,066,806
STOCK BAR FEED APPARATUS
Filed July 17, 1959  6 Sheets-Sheet 4
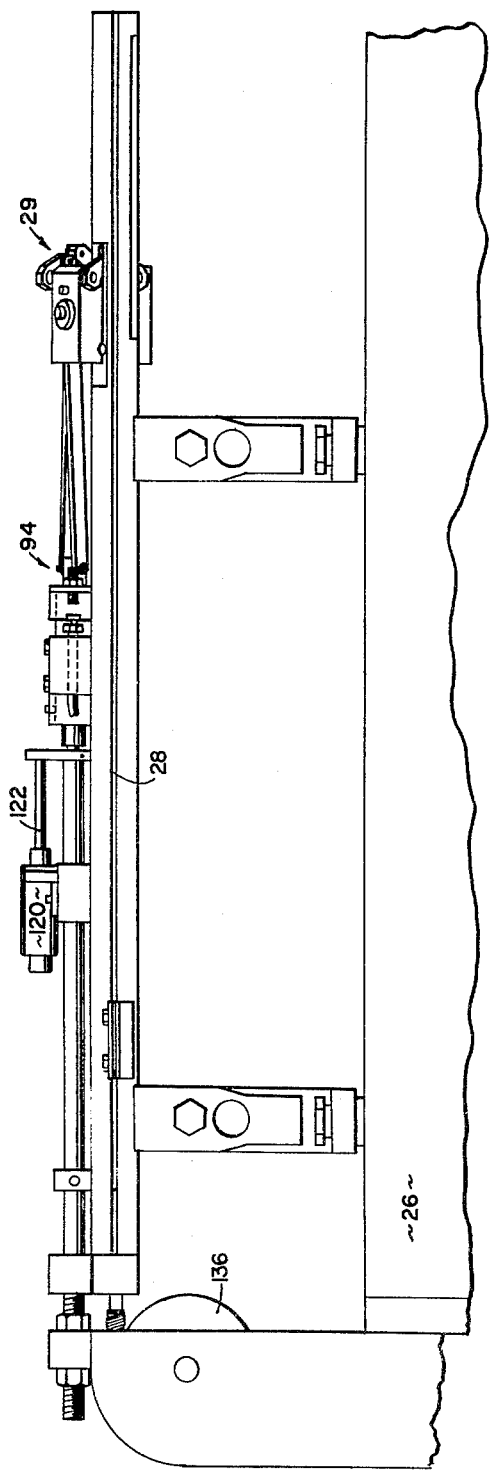
FIG_6_
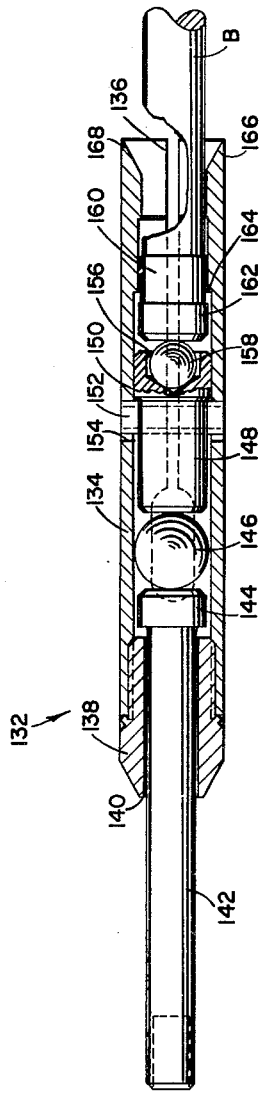
FIG_7_
INVENTOR.
Franklin D. Lakins
Gerald B. Lanphere
BY
D. Emmett Thompson
ATTORNEY Dec. 4, 1962     F. D. LAKINS ET AL     3,066,806
STOCK BAR FEED APPARATUS
Filed July 17, 1959     6 Sheets-Sheet 5
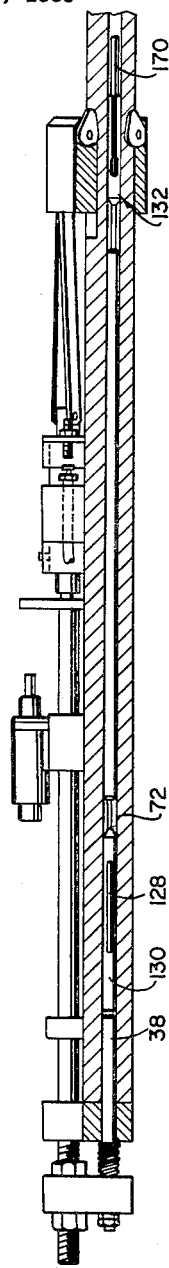
FIG_8
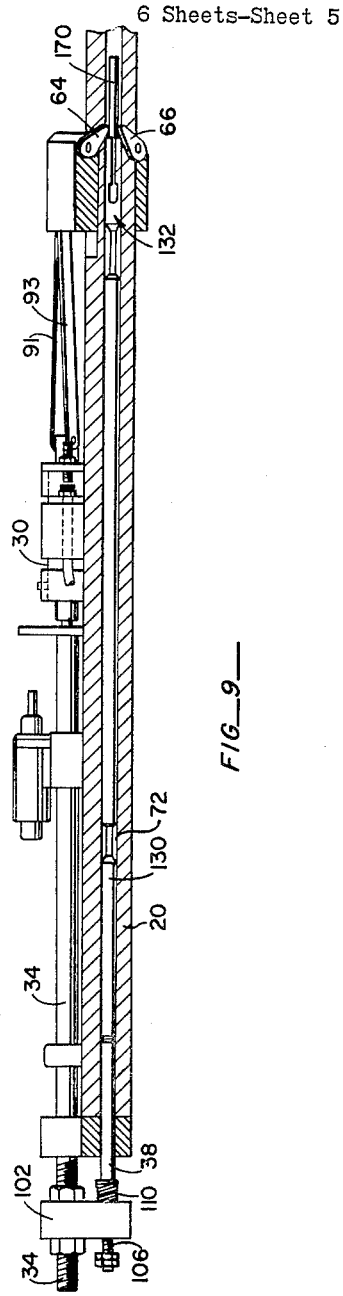
FIG_9
INVENTOR.
Franklin D. Lakins
Gerald B. Lanphere
BY
D. Emmett Thompson
ATTORNEY Dec. 4, 1962   F. D. LAKINS ETAL   3,066,806
STOCK BAR FEED APPARATUS
Filed July 17, 1959   6 Sheets-Sheet 6
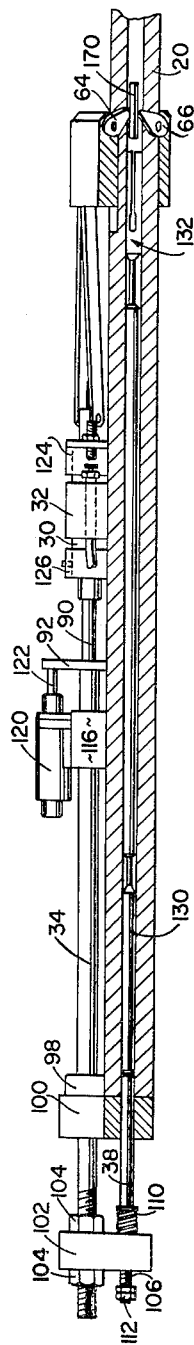
FIG—10
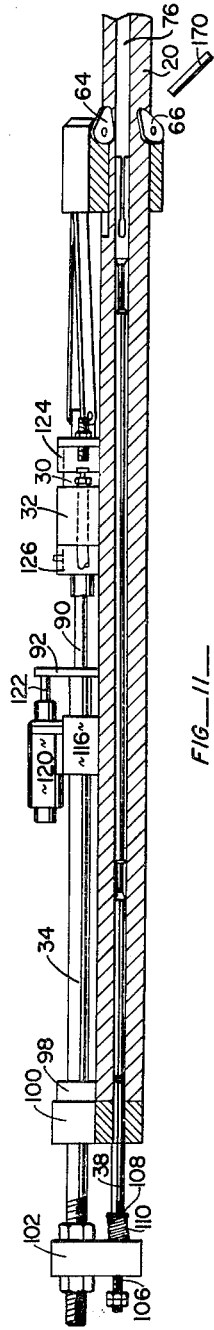
FIG—11
INVENTOR.
Franklin D. Lakins
Gerald B. Lanphere
BY
D. Emmett Thompson
ATTORNEY

United States Patent Office 3,066,806
Patented Dec. 4, 1962

3,066,806
STOCK BAR FEED APPARATUS
Franklin D. Lakins and Gerald B. Lamphere, Syracuse, N.Y., assignors to Lipe-Rollway Corporation, Syracuse, N.Y., a corporation of New York
Filed July 17, 1959, Ser. No. 827,955
4 Claims. (Cl. 214—1.2)

This invention relates to and has as an object a new and improved apparatus for ejecting a remnant of bar stock from a bar feeding machine of the type disclosed in Patent No. 2,595,522 issued May 6, 1952 to B. C. Harney.

More particularly this invention has as an object a new and improved apparatus for ejecting the bar stock remnant from the rear of the bar feed machine of the type disclosed in our copending application No. 698,820 filed November 25, 1957, now Patent 2,906,003, issued on September 29, 1959.

More specifically this invention has as an object improved remnant gripping means.

In addition, this invention has as an object an improved control system for controlling the remnant ejection from the bar feeding machine.

Another object of this invention is the provision of safety means for halting the operation of the bar feed machine in the event of faulty remnant retraction.

The apparatus disclosed in application No. 698,820, above-referred to, had several shortcomings. Number one, the bar grippers of that application did not satisfactorily grip bar stock of varying diameter. Further, the means of resetting the grippers after a remnant ejection operation was faulty and on occasion failed to function properly. Finally, the control system disclosed in the above-referred to application was not satisfactory for the reason that if no remnant was retracted by the bar feed apparatus the control system did not function to halt the operation of the bar feed machine which caused damage to the bar feeding and bar working machines due to the fact that a fresh bar was fed into the bar working machine before ejection of the remnant from the previous bar.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a perspective view of the new and improved apparatus embodying the invention.

FIGURE 2 is a top plan view of the apparatus shown in FIGURE 1.

FIGURE 3 is a sectional elevational view of the bar gripping apparatus taken on line 3—3 of FIGURE 2.

FIGURE 4 is a view taken looking on line 4—4 of FIGURE 3.

FIGURE 5 is a view of the opposite side of the bar gripping apparatus from that shown in FIGURE 4.

FIGURE 6 is a side elevational view of the apparatus shown in FIGURE 2.

FIGURE 7 is a cross-sectional elevational view of the stock pusher of the apparatus.

FIGURES 8, 9, 10 and 11 are views in the nature of a flow sheet showing the various steps in the operation of the apparatus.

FIGURE 12 is a diagrammatic view of the control system of the apparatus.

In FIGURE 1, the breech section of a bar feed apparatus of the type disclosed in Patent No. 2,595,522 above-referred to, is indicated by reference numeral 20. The breech section 20 is mounted by means of a suitable standards 22, 24 on the base 26 of the bar feeding machine. The breech section 20 is provided with a bar receiving bore and an axially extending slot 28 through which the stock bar pushing apparatus mounted in the bore is connected to a driving cable (not shown).

Mounted at the forward end of the breech section 20 is the bar end or remnant gripping apparatus, generally indicated at 29. The bar gripping apparatus is connected by means to be hereinafter described to a cylinder 30 mounted in a saddle block 32. The cylinder 30 is connected by means to be hereinafter described in detail to a rod 34 which is connected by means, generally indicated at 36, to a bumper rod 38 extending rearwardly out of the bore of the breech section 20.

The bar end or remnant gripping apparatus is shown in detail in FIGURES 3, 4 and 5 and, as best seen in FIGURES 1, 2 and 6, bar gripping apparatus 29 is mounted at an angle of 45 degrees with respect to the slot 28 formed in the breech section 20 of the bar feeding apparatus.

Referring to FIGURE 5, the bar gripping apparatus is made up of a pair of blocks 40, 42 which are mounted on flat portions 41, 43 formed on the breech section 20. The blocks 40, 42 are fixedly mounted by means of the cap screws 44, 46 which are threadedly received in the breech section 20. The rear ends of the blocks 40, 42 are formed on their underside with transversely extending V-shaped notches 47 and a fulcrum pin 48 is mounted in each of the notches by means of roll pins 50. The bar feed tube flat portions 41, 43 are also provided with V-shaped notches 52 in which the pins 48 are received thereby providing pivot points for movement of the blocks 40, 42. The tube 20 is provided forwardly of the notches 52 with a pair of stop pins 54 having enlarged head portions 56 received in notches 58 formed on the underside of the blocks 40, 42. The forward portions of the blocks 40 and 42 are provided with set screws 60 and 62 mounted in threaded apertures aligned with the heads 56 of the stop pins 54.

As will be obvious, the blocks 40 and 42 may be moved radially inwardly or outwardly in an arcuate path toward or away from the tube 20 by loosening the screws 44 and 46 and adjusting the set screws 60 and 62 on the heads 56 of the stop pins 54.

A pair of bar gripper fingers 64 and 66 are mounted on a pair of shafts 68, 70 extending through the forward ends of the blocks 40, 42. The inner ends of the gripper fingers 64 and 66 enter the bore 72 (see FIGURE 3) of the breech section 20 through a pair of slots 74 and 76 formed in the tube 20. The tube 20 is also formed adjacent the gripper fingers 64 and 66 with an ejection slot 77 for a purpose to be hereinafter described.

As best seen in FIGURE 5, the gripping angle of the fingers 64 and 66 with respect to a vertical centerline is approximately 15°. This angle has been found in practice to be desirable to effectively grip the bar remnant to facilitate separation of the remnant from the stock pushing mechanism. Due to the fact that the blocks 40 and 42 which carry the fingers 64 and 66 may be adjusted radially inwardly or outwardly toward the bore of the breech section 20, the gripping angle of 15° is maintained regardless of the diameter of the bar stock being fed by the bar feeding machine whereby to effectively grip the bar remnant regardless of the diameter thereof.

Referring now to FIGURES 3 and 4, the outer ends of the shafts 68 and 70 are affixed by pins 78 to links 80 and 82 and the inner ends of the links 80 and 82 are pivotally connected, as at 84, to levers 91 and 93. As will be obvious, movement of the levers 91 and 93, and links 80, 82 connected thereto will effect oscillation of the gripper fingers 64 and 66. The fingers 64 and 66 serve to grip the bar end remnant therebetween when in the position shown in FIGURE 5, and when movement of the levers 91, 93 and links 80, 82 is effected by means to be hereinafter described, the remnant gripped between the fingers 64 and 66 will be released to drop out of the tube 20 through the slot 77.

Referring now to FIGURES 1, 2 and 6, the opposite ends of levers 91 and 93 are pivotally connected as at 94 to a lug 96 formed on the blank end of the cylinder 30. The piston rod 90 extending from the opposite end of the cylinder 30 is connected to an upstanding plate 92 which in turn is connected to the rearwardly extending rod 34.

A stop collar 98 is mounted on the rod 34 intermediate the ends thereof and serves to limit the rearward movement of the rod 34.

Rod 34 extends through a bearing block 100 mounted on the rear end of the breech section 20 and is affixed to a connecting block 102 by means of a pair of nuts 104. The connecting block 102 extends towards the bore of the breech section 20 and the outer end 106 of the bumper rod 38 is telescopically received in a bore formed in the block 102. The end 106 of the bumper rod 38 is formed of a reduced diameter and the inner end of the reduced portion 106 is provided with a stop collar 108 and a compression spring 110. The outer end of the portion 106 is provided on the opposite side of the block 102 with a nut 112, all whereby the portion 106 is slidably mounted in the block 102 and the spring 110 normally urges the rod 38 forwardly so that the nut 112 engages the rear face of the block 102. As best seen in FIGURES 8, 9 and 10, the inner end of the bumper rod 38 is received within the bore 72 of the breech section 20.

Mounted on the upper surface of the breech section 20 of the bar feed tube intermediate the saddle 32 and bearing block 100 is a block 116 formed with a bore 118 through which the rod 34 is free to slide. A reset cylinder 120 having a spring returned piston rod 122 is mounted on the upper surface of the block 116 and the rod 122 is positioned to engage the plate 92 upon actuation of the cylinder 120 for a purpose to be hereinafter described.

The cylinder 30 is provided with front and rear collars 124, 126, respectively, to limit the movement of the cylinder 30 within the block 32.

As set forth in Patent No. 2,595,522 above-referred to, a stock pusher of any suitable type indicated generally at 130 (see FIGURES 8, 9, 10 and 11) is mounted for forward and rearward movement within the bore 72 of the bar feeding machine. The stock pusher 130 is suitably connected to the flag 128 extending outwardly from the bore 72 through the slot 28 formed in the section 20 and the flag is affixed to a drive cable 134 entrained at its rearward end over an idler pulley 136, see FIGURE 6, mounted on the rear of the frame 26. The drive cable 134 is driven by suitable mechanisms, such as disclosed in the patent previously referred to, to move the stock pusher 130 forwardly and rearwardly in the bar feed machine. The stock pusher 130 includes a bar engaging and gripping collet, generally indicated at 132, see FIGURE 10, mounted at the forward end of the pusher 130.

The collet-type pusher 132 is shown in detail in FIGURE 7, and includes a cylindrical spring metal casing 134 formed at the forward end with an axially sawed slot 136. The rear end of the casing 134 is provided with a nut 138 having a bore 140 in which the forward end of a pusher rod 142 is received. The inner end of the rod 142 is formed with an enlarged head portion 144 and the threaded connection between the nut 138 and the casing 134 serves to retain the rod 142 in the nut bore 140. An anti-friction ball bearing 146 is mounted forwardly of the enlarged head 144 of the rod 142 and a collet opening stop member 148 having an enlarged head portion 150 is mounted forwardly of the member 146. The stop member 150 has a pin 152 extending transversely therethrough and the outer ends of the pins 152 are received in a pair of elongate slots 154 formed in the casing 134.

The enlarged portion 150 of the stop 148 is provided at its forward end with a hole 156 in which a second anti-friction ball bearing 158 is mounted. A bar stop 160 having an enlarged head 162 is mounted forwardly of the bearing 158.

Forward end of the casing 134 is formed with an internal annular shoulder 164 of a lesser diameter than that of the head portion 162 of the stop member 160 whereby to prevent the member 160 from leaving the casing 134.

The slot 136 forms a pair of spring fingers 166 and 168 at the forward end of the casing 134 and the rear end of the bar stock B is received between and gripped by the fingers 166 and 168 whereby upon rearward movement, or movement to the left, as viewed in FIGURE 7, the bar stock remnant, or end piece, will be retracted in the bar feed machine by the collet 132. The collet 132 comprises a separate invention which is the subject of a copending application.

Upon rearward movement of the stock pusher, the bar remnant held in the collet 132 is moved rearwardly with the collet 132 until the rear of the stock pusher 130 engages the inner end of the bumper rod 38 positioned in the bore 72. The condition of the apparatus at the point of contact between the pusher 130 and bumper 38 is shown in FIGURE 8.

When the pusher 130 engages the bumper 38, the bumper 38 is moved through the block 102 by reason of the reduced end portion 106 of the bumper 38 until the spring 110 which acts as a dampener is compressed sufficiently to halt further movement of the portion 106 in the block 102. Thereafter, the block 102 and rod 34 are moved rearwardly, or to the left, as viewed in FIGURE 9. This movement of the rod 34 moves the entire cylinder 30 to the left to the position shown in FIGURE 9. Movement of the cylinder 30 in turn causes movement of the levers 91 and 93 and links 80 and 82 causing the gripper fingers 64 and 66 to move in an arcuate path radially inwardly in the breech section 20 into the bore 76 to engage the bar end remnant indicated at 170.

As seen in FIGURE 10, continued movement of the pusher 130 rearwardly, or to the left, moves the piston rod 90 out of the cylinder 30 to the position shown in FIGURE 10. In addition, the continued movement of the pusher 130 against the gripping action of the fingers 64 and 66 moves the collet 132 off of the remnant 170.

Thereafter the introduction of pressure into the forward, or left-hand side of the cylinder 30 moves the cylinder body in the saddle 32 to the right into the position shown in FIGURE 11. This movement is transmitted through the levers 91 and 93 and links 80 and 82 to open the fingers 64 and 66 to permit the remnant 170 to drop out of the tube 20 through the ejection slot 77.

Thereafter, as best seen in FIGURES 1, 2 and 6, the introduction of pressure into the cylinder 120 moves the rod 122 into engagement with the plate 92 to return the rod 90 into the cylinder 30 and to reseat the bumper rod 38 in the bore 72 to the position shown in FIGURE 8.

The control system for operating the apparatus in the manner just described is illustrated in FIGURE 12 and will now be described in detail. During the bar feeding cycle of the bar feed machine fluid pressure is connected from the main feed line 174 by means of a T-connection 176 to line 178. The line 178 enters the rear of the reset cylinder 120 and serves to cause the rod 122 to be forced outwardly into engagement with the plate 92 to reseat the entire mechanism to the position in FIGURES 8 and 12 for the next ejection operation. When there is no pressure in line 174, the rod 122 will be returned to its inner position by means of a spring within the cylinder 120.

Upon completion of the feed-out of the bar feeding machine pressure is introduced into the line 180 to the return side of the main bar feeding cylinder of the bar feed machine, as disclosed in the patent above-referred to. By means of a T-connection 182, this pressure is introduced into the line 184 which enters a main control valve, generally indicated at 186.

The main control valve 186 comprises a base 188 and a cylinder casing 190. A pair of cylinders 192 and 194 are formed within the casing 190 and a pair of pistons 196, 198 are mounted for sliding movement within the cylinders 192 and 194 whereby to form pilots 199 and 200. The pistons 196 and 198 are connected by the member 201 and a valve seat slide 202 depends from and is connected to the member 201. Each of the pistons 196 and 198 is formed with a bleed port 204 into the pilots 199 and 200.

When air is introduced into the valve 186 through line 184, the air enters the cylinders 194 and 192 and bleeds through the ports 204 formed in the pistons 196 and 198 into the pilots 199 and 200. Due to the fact that a smaller volume is connected to the pilot 200 pressure will build up faster in the pilot 200 on the rear side of the piston 198 causing the slide and seat 202 to shift from the position shown in the solid lines to the position shown in the dash lines. Thereupon the pressure in the valve 186 from line 184 passes through the valve 186 and into the line 203 which is connected through the collar 126 to the rod end of the cylinder 30. This causes the rod 90 and cylinder 30 to become rigid and to move as a unit.

When the pusher 130 strikes the bumper 38, the rod 90 and cylinder 30 move as a unit and cause the gripper fingers 64 and 66 to close upon and engage the remnant 170, as shown in FIGURE 9, through the mechanism previously described. Continued rearward movement of the pusher causes the rod 90 to move to the left, as viewed in FIGURE 10, to permit the collet 132 to move off the remnant 170, as also shown in FIGURE 10. During this movement, the actuator 203a of a valve 205 is engaged by the pusher structure drive mechanism whereby pressure on the rear side of the piston 198 in the pilot 200 is connected through the line 206, valve 205 and line 208 to atmosphere to exhaust the pressure in the pilot 200.

Exhaustion of the pressure on the rear side of piston 198 causes the valve seat to move from the dashed line position to the solid line position, as shown in FIGURE 12. In this position, the pressure on the rod side of the cylinder 30 is connected by line 203 through valve seat 202 to line 210 which is open to atmosphere to exhaust the pressure on the rod side of the cylinder 30. Also in this position, pressure is connected by line 184 through the valve 186 to line 212. Pressure in line 212 serves to shift the magazine section of the stock tube, as described in the patent above-referred to, to load a new bar stock in the magazine section of the bar feed machine, and pressure in line 212 is connected by means of a T-connection 214 to line 216. Line 216 is in turn connected through the collar 124 to the blank or right-hand end of the cylinder 30 thereby moving the cylinder 30 on the rod 90, in the saddle 32, to the right from the position shown in FIGURE 10 to the position shown in FIGURES 11 and 12. This movement opens the gripper fingers 64 and 66 by the mechanism previously described to permit the remnant 170 to pass out of the tube through ejection slot 77, as is seen in FIGURE 11.

The feeding of pressure through line 212 to the stock tube shift cylinder (not shown) causes pressure to again be fed through line 174 to the feed side of the main cylinder (not shown) of the bar feeding apparatus. The introduction of pressure into line 174 causes the reset cylinder 120 to be actuated, as previously described to reset the rod 90 within the cylinder 30 to the position shown in FIGURES 1, 2, 6, 8 and 12, and the bumper 38 within the bore 72 for the next remnant ejection cycle.

The control system just described is provided with a safety feature whereby to halt the operation of the bar feed machine if no remnant is retracted by the collet 132 with the pusher 130. If the remnant is held in the spindle of the bar working machine, or escapes from the collet 132, or for any reason is not in the collet when the collet passes through the gripper fingers 64 and 66, the operation of the bar feed machine will be halted to prevent any damage to the bar feeding or bar working machine should a new bar be fed into the bar feeding machine before the remnant has been removed. As best seen in FIGURE 12, the pilot 199 of the valve 186 is connected by a line 220 to a poppet valve 222 having an activator 223 mounted on the forward side of the block 32. An outwardly extending plate 224 is mounted on the outer side of the collar 124 on the cylinder 30 and the outer end of the plate 224 is provided with an adjustable screw 226 which may be locked in any adjusted position in the plate 224 by the nut 228.

When pressure is being fed through the line 180 to retract the pusher structure 130, if no remnant is carried by the collet 132, the pusher 130 will move further to the left than the position shown in FIGURE 9 due to the fact that the fingers 64 and 66 will not engage any remnant and close completely. The setting of the screw 226 with respect to the actuator 223 of the valve 222 is such that this additional movement of the pusher when no remnant is carried by the collet 132 will cause the screw 226 to engage the actuator 223 thereby exhausting the pressure in the pilot 199 on the rear side of the piston 196. Almost simultaneously with this actuation of the poppet 222, the valve 205 is actuated by the bar feed drive mechanism thereby connecting the pressure in the pilot 200 on the rear side of the piston 198 to exhaust whereby to prevent any shift in the slide 200 of the valve 186. With both of the rear sides of the piston 196 and 198 connected to exhaust, any further movement of the valve seat 202 is halted. This halt in the operation of the ejection cycle serves to notify the operator of the machine that no remnant has been retracted. After the operator has cured the difficulty the cycle may be restarted by manually opening the gripper jaws thus moving the cylinder 30 to the right, as viewed in FIGURE 12, to move the screw 226 off the actuator 223 of the poppet valve off 222. This closes the rear side of the piston 196, thus permitting the slide to shift to the solid line position, shown in FIGURE 12 to restart the cycle.

What we claim is:

1. In a rear end remnant retraction and ejection bar feed machine having a bar feed guide tube, the improvement comprising a pair of bar end remnant gripping fingers mounted for pivotal movement into and out of the bar feed guide tube to grip a bar end remnant between said fingers, said fingers being pivotally mounted adjacent one end of a pair of blocks, the opposite end of each of said blocks having a fulcrum pin affixed thereto, said pins seating in V-shaped grooves formed in the exterior of said guide tube, the opposite end of said blocks being provided with adjustable means to rotate the blocks about said fulcrum pins whereby to vary the distance between the axis of rotation of said fingers to receive bar end remnants of varying diameter therebetween.

2. In a breech end remnant ejecting bar feed machine having a bar feed guide tube, a stock pusher movable forwardly and rearwardly in said guide tube and a control system for moving said pusher forwardly and rearwardly and means for ejecting a bar remnant from the breech end of said machine upon rearward movement of said pusher carrying said remnant, the improvement comprising means operable when said pusher reaches its rearward most point of travel for automatically halting the operation of said machine when no remnant is carried rearwardly by said pusher, said means including a shut-off switch positioned for actuation by means connected to said pusher.

3. In combination, a breech end remnant ejecting bar feed machine having a bar feed guide tube, a stock pusher movable forwardly and rearwardly in said guide tube and a control system for moving said pusher forwardly and rearwardly and means for ejecting a bar remnant from the breech end of said machine upon rearward movement of said pusher carrying said remnant, a master control valve for controlling said bar remnant ejection means, one end of said control valve being connected to a safety valve positioned to be opened by additional rearward movement of said pusher when no remnant is carried by said pusher, the opening of said safety valve exhausting said end of said control valve to halt the operation of said machine.

4. A breech end remnant ejecting bar feed machine for use in connection with a bar working machine, said bar feeding machine having a bar feed guide tube, a stock pusher mounted for forward and rearward movement in said tube, a pair of bar end gripping fingers mounted for movement into and out of the bar feed guide tube adjacent the breech end of said machine, motion transmitting means operable upon rearward movement of said stock pusher in said tube to move said fingers into said tube and into engagement with a bar remnant carried by said pusher and control means responsive to further rearward movement of said pusher to open said fingers to permit said remnant to be ejected from said tube, reset means including a reset cylinder operable upon forward movement of said pusher in said tube to reset said motion transmitting means to permit ejection of the next end remnant, said control means including a master control valve having a pair of pilots, and means for exhausting both pilots of said master valve to halt the operation of said machine when no remnant is moved rearwardly by said stock pusher.

References Cited in the file of this patent
UNITED STATES PATENTS

| | | |
|---|---|---|
| 1,144,387 | Skelton | June 29, 1915 |
| 1,928,430 | Lindgren | Sept. 26, 1933 |
| 2,229,800 | Dean | Jan. 28, 1941 |
| 2,906,003 | Lakins | Sept. 29, 1959 |